April 13, 1948. P. A. CRESSEY 2,439,561
PRESSURE INDICATOR FOR PNEUMATIC TIRES
Filed Aug. 8, 1944 4 Sheets-Sheet 1
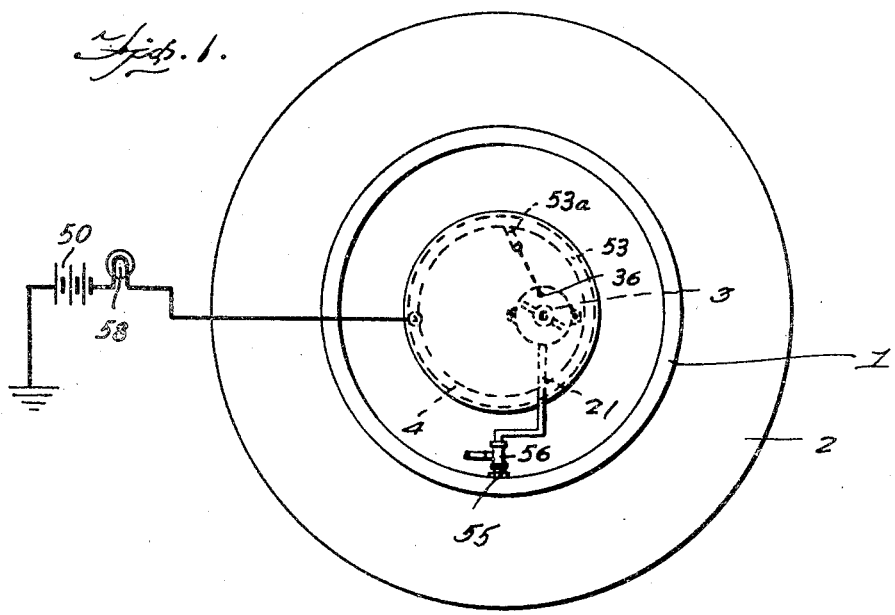
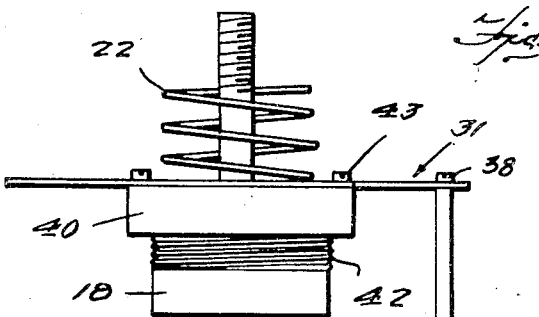
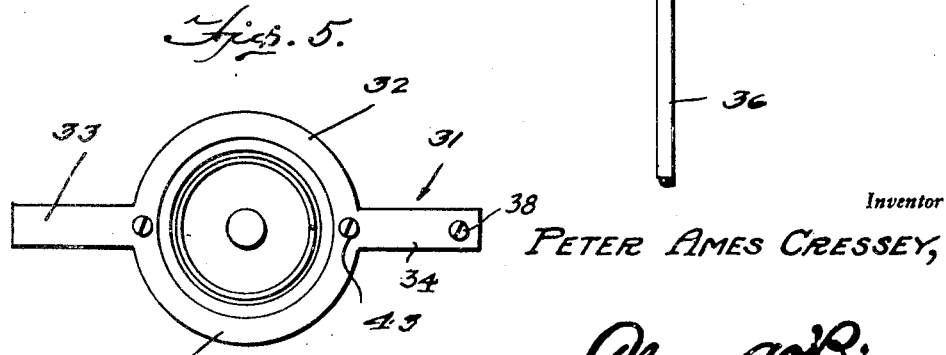
Inventor
PETER AMES CRESSEY,
By
Attorneys Inventor
PETER AMES CRESSEY, April 13, 1948.  P. A. CRESSEY  2,439,561
PRESSURE INDICATOR FOR PNEUMATIC TIRES
Filed Aug. 8, 1944  4 Sheets-Sheet 3

Inventor
PETER AMES CRESSEY,
By Clarence A. O'Brien
and Harvey B. Jacobson
Attorneys April 13, 1948.  P. A. CRESSEY  2,439,561
PRESSURE INDICATOR FOR PNEUMATIC TIRES
Filed Aug. 8, 1944  4 Sheets-Sheet 4
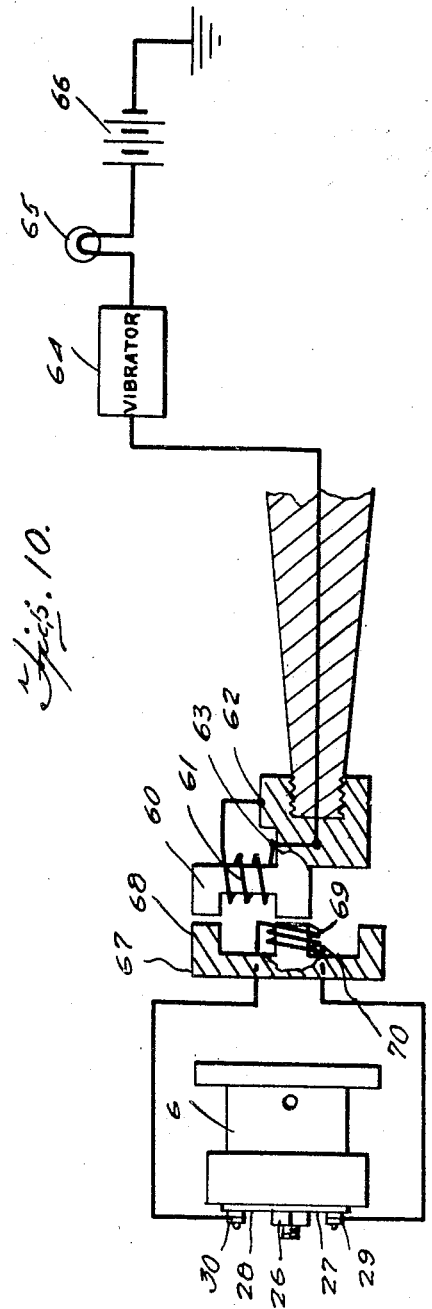
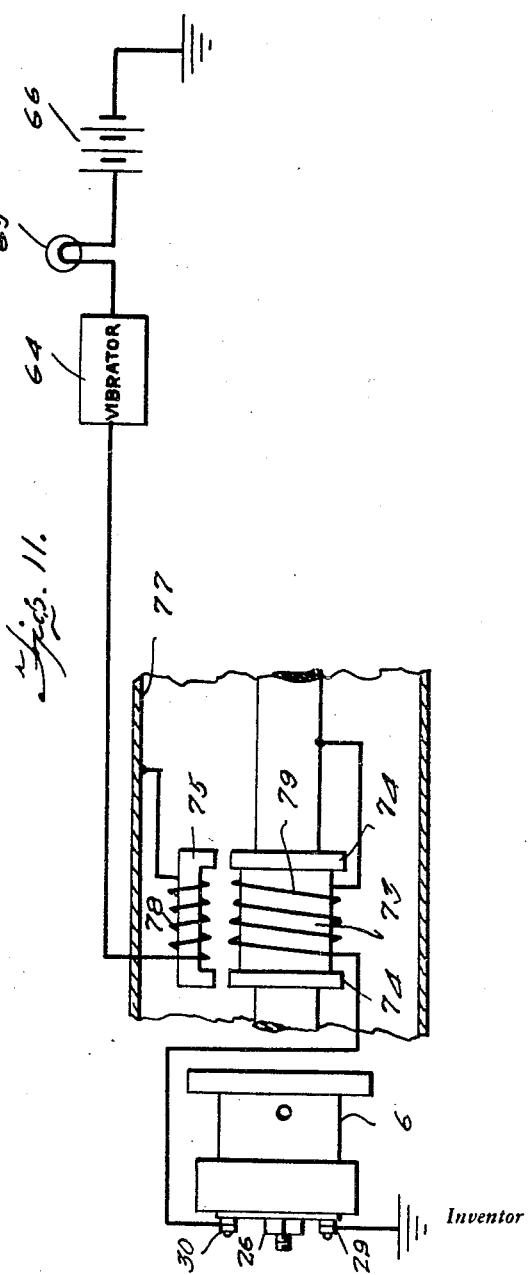
Inventor
PETER AMES CRESSEY,
By
Attorneys

Patented Apr. 13, 1948

2,439,561

UNITED STATES PATENT OFFICE 2,439,561

PRESSURE INDICATOR FOR PNEUMATIC TIRES

Peter Ames Cressey, McGregor, Tex.

Application August 8, 1944, Serial No. 548,554

2 Claims. (Cl. 177—311)

This invention relates to pressure indicators for pneumatic tires and it has special reference to that type of pressure indicator which is attached to a rotating wheel and is operated by air pressure equal to that prevailing within the tire itself.

Pressure indicating devices for pneumatic tires as hitherto used are mainly of a type which is most suitable for high pressure tires in which great differences of pressure are permissible. They operate by means of a feeler, capped stud or the like applied against the wall of the tire and pressing or actuating an indicating plunger which is under spring pressure. They have to be arranged, therefore, on the rim of the wheel. They have the advantage of avoiding connections which have to be sealed hermetically but they have the great disadvantage that the indication is far from accurate and that they are merely able to indicate relatively great variations of pressure; moreover, the attachment of the indicator to the rim of the wheel causes various difficulties as the influence of the centrifugal forces on the indicator is by no means negligible.

As it has been found that tire conservation is dependent on the maintenance of definite pressure within the tire which should vary within narrow limits, more accurate indicating devices than those above described are necessary.

Indicating devices which can be arranged in the hub have been proposed but they had the serious drawback that they required one or even several mechanical seals in addition to the seal necessary for sealing the tire itself. As known in the art hermetic mechanical seals can be kept sealed only with difficulty, if at all. At these imperfectly sealed places slow leaks develop so that the indicator becomes a permanent source of trouble.

It is the main object of the present invention to overcome the inconvenience and difficulties associated with the known pressure indicators for tires and to provide an indicating device of high accuracy, not influenced by the centrifugal forces due to the rotation of the wheel to which it is attached and with which it rotates and which has no mechanical seals other than those already employed which are apt to cause leakages.

A further object of the invention consists in providing a device of the type indicated without frictional contacts which are in permanent use and which cause excessive wear and uncertain operation.

Further objects and advantages will be apparent from the detailed description of a modification of the invention with reference to the accompanying drawings, in which—

Figure 1 is a side view of a wheel provided with a pressure indicator according to the invention, the general arrangement of the circuit connection on a vehicle being diagrammatically indicated.

Figure 4 is an elevational view of the indicating spring-pressed piston and of the current carrying parts associated with the same.

Figure 5 is a plan view of the parts shown in Figure 4.

Figure 10 is a diagram illustrating an arrangement operated with A. C. mounted on the front wheel of a car, while Figure 11 is a similar diagram illustrating the same type of arrangement on the rear wheel of a car.

Figure 2:
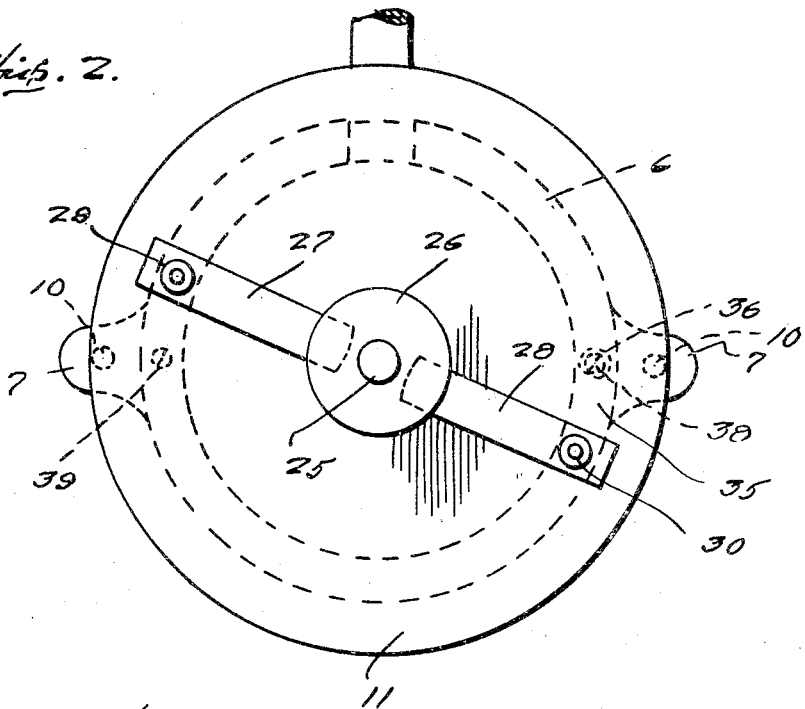
Figure 2 is a plan view of the indicating device.
Figure 8:
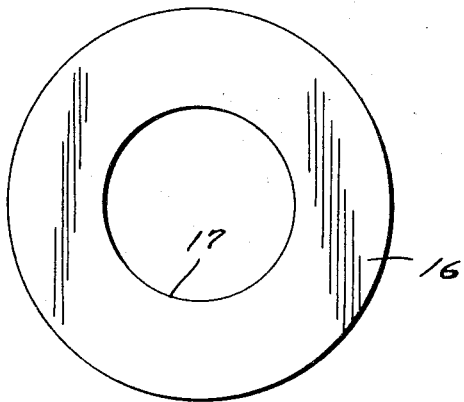
Figures 8 and 9 are plan views of several details.
Figure 9:
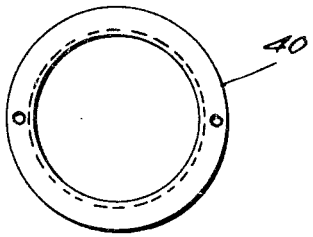

The general arrangement of a pressure indicator on a wheel is shown in Figure 1 of the drawings in which the reference numeral 1 indicates the rim of a wheel on which a tire 2 whose pressure is to be supervised is mounted. The pressure indicator, generally indicated at 3, is mounted on the hub portion 4 of the wheel preferably within the cap covering the hub and wherever possible it is arranged centrally. Where central arrangement is not possible the indicator may be arranged as closely as conveniently possible to the center as shown in Figure 1.

The indicator 3 is a self-contained unit preferably of cylindrical shape with all its moving parts guided and arranged axially so that they perform merely axial movement. The direct influence of the centrifugal forces on said movable parts is thus eliminated.

The pressure indicator comprises a cylindrical container 6 with a base plate 8 having a concavely-shaped inner surface 9 and provided on on the outside with flanges or lugs 7, by means of which said container may be fixed on the hub portion 4 of the wheel with its longitudinal axis at right angles to the plane of the wheel. Holes 10 on said lugs 7 permit the passage of the screw bolts (not shown) by means of which these parts are attached to each other.

In the lower portion of the cylindrical container a passage or duct 5 is arranged giving access to the interior of the container for a purpose to be described.

Into the inner as well as into the outer side of the cylindrical wall of the container 6 screw-threads 13 and 14, respectively, are cut, the latter engaging corresponding screw threads provided on the inside of a depending border flange or rim 12 of a cover or lid 11 adapted to close the container entirely when screwed on the same. Said cover is provided with a smooth central opening 15.

The screw-threaded part 13 provided on the inside of the cylindrical wall engages a screw-threaded ring or annular collar 16 with a central opening 17. Between said collar 16 and the base plate 8 a pressure bag 19 is inserted, containing the pressure chamber 20 which is in permanent communication with the pressure space of the tire to be supervised. The pressure bag 19 is preferably made of rubber or of similar elastic material and it has the shape of a bladder with reinforced side walls and a heavy peripheral rim. Its bottom part fits into the concave upper surface of the plate 8 while its upper portion is firmly held at its peripheral part by the collar or ring 16 which is screwed down to the extent required to obtain a firm gripping of the said peripheral part of the pressure bag between the collar and the base plate.

The pressure bag 19 is, moreover, provided with a tubular piece, pipe or hose 21, preferably integral with the bag itself, and made of the same material. This tubular piece 21 passes through the duct 5 in the container 6 which is provided for this purpose and is joined, as shown in Figure 1, along a radial or approximately radial line of the wheel with the valve receiving tubular stem 55 of the tire 2.

Preferably the valve is removed from the stem and one of the standard T-pieces 56 containing a valve and provided with two connections is substituted. The stem 55 of the tire itself and the tubular piece 21 are both screwed into the two openings of the T-piece 56, which carries the valve. Both the stem and the tube 21 are sealed by the conventional valve. When the tire has to be removed the T-piece 56 with the valve is unscrewed from the stem. In this way a single hermetic seal, such as usual in tires is provided for both the tire and the pressure chamber so that the number of seals to be supervised is not increased by the indicator.

The pressure bag 19 is in permanent contact with a piston 18 resting on the bag and pressed against it by means of a spring 22 which on the other side, finds its support on the lid or cover 11.

In its central part the piston 18 carries a rod 24 provided with screw threads 25 which passes through the smooth opening 15 of the cover or lid 11 and which at its end carries a nut 26 of conducting material.

This nut cooperates with two contact strips 27, 28 which are fixed on the lid 11 and which are provided with binding posts 29, 30 for making electrical connections. When the lid and the container are made of insulating material the strips may be simply fixed to the surface of the lid. When these members are made of light metal or of an alloy, insulating strips (not shown) may be interposed between the conducting strips 27, 28 and the lid itself to prevent electrical contact between these parts.

The piston 18 is held, guided and brought into electrical contact with a source of current by means of a bridge piece 31 having a circular middle portion 32 and two straight side arms 33 and 34, one of said side arms 34 is attached to the end of a metal rod 36 forming a long binding post running through an axial hole 37 in the cylindrical wall from one end to the other. The end (not shown) of the rod 36 is connected with that part which transmits current from the stationary frame of the vehicle to the rotating wheel. This current transmission is effected in the usual way by means of a brush 53a (Fig. 1) running on a contact ring 53 or the like.

A screw 38 is carried by the top portion of the rod 36 and between it and the rod 36 one arm 34 of the bridge piece 31 is firmly held. The second arm may rest on another screw 39 at the proper place in the end of the cylindrical wall of the container 6. It is, however, not fixed but simply supports the bridge piece 31 on its head and prevents sagging when the pressure chamber is deflated.

The bridge piece 31 is connected with the piston 18 (Figures 4 and 5) by means of an annular sleeve 40, provided with internal screw threads, which engage corresponding screw threads 42 on the outer circumference of the piston 18. Small screws 43 arranged in a sufficient number connect the bridge piece 31 with the sleeve.

All the parts inserted between the rod 36 and the piston 18 as well as the latter itself, are made of material which are good conductors of electricity, so that the current entering by means of the rod 36 can flow without resistance over the parts 31, 43, 40 to the piston 18, the central stem 25 and the nut 26.

It will be noted from the foregoing description that the movable parts are finely adjustable and that especially the air pressure at which the indicator becomes operative can be finely adjusted. Normally the piston 18 rests on the pressure bag 19 which is inflated to such an extent that the spring 22 is compressed, while the unit 26 protrudes and is out of contact with the contact strips 27 and 28. The pressure which operates the alarm signal is, therefore, adjustable by means of the nut 26 but it can also be adjusted by means of the lid or cover 11 whose position may be changed by screwing it down on the container 6 or by unscrewing it, an adjustment which will compress or expand spring 22.

The operation of the device will be clear from the above description of the parts. Assuming that D. C. from the battery of a vehicle (automobile, airplane) is used, the current path runs from grounded battery 50 (Figure 1) over an indicating device 58 on the driver's or pilot's dashboard and from there to a contact ring 53 and a brush 53a which is fixed on rod 36. The circuit then includes said rod 36, bridge piece 31 fixed thereto to sleeve 40, piston 18, stem 25 and nut 26. The remaining part of the circuit includes the strips 27, 28 and the binding posts 29, 30 which are connected with the body of the vehicle, usually called "ground."

The circuit thus consists of three parts separated by the two points of connections which are not permanent, one of these points is formed by the brush 53a attached to rod 36 and the other point is the nut 26 carried by the piston stem 25.

When the tire holds air of sufficient pressure, the circuit is broken at these two points as the piston is pressed towards the lid of the container and thereby lifts the stem with the nut 26 and also holds the rod 36 to which it is attached in a lifted position in which the brush 53a does not touch the contact ring 53.

When the tire is deflated, the piston is no longer held in the position described and the spring presses it against the deflated pressure bag 19. The nut 26 thus comes into contact with the strips 27 and 28 and the brush 53a comes into contact with contact ring 53. The circuit is thus closed and the annunciator device will operate.

The purpose of this arrangement resides in the separation of all moving contacts during the period in which the tire pressure is normal; merely when the pressure has fallen, the movable contacts come into contact. Thus, the annunciator device is free of parts which are in permanent frictional contact and therefore practically free of parts requiring supervision.

Another method of avoiding the permanent frictional engagement of current carrying parts consists in the use of A. C. induced in the wheel. Such an arrangement when adapted to operate on the front wheel of a car is shown in Figure 10.

A front wheel, as well known, rotates on a fixed axle or cone. The arrangement, according to the invention, consists of two separate circuits, one of which is arranged on the vehicle body while the other is mounted on the wheel. They are coupled in the following way.

On the axle close to the wheel, an inductor core 60 is arranged preferably with one of its legs centered in the axle around which the wheel turns. Said core carries a primary winding 61 which is grounded or connected with the body of the vehicle at 62 at one of its terminals while the other terminal 63 is connected with an insulated conductor leading to a vibrator 64, to an annunciator device 65 on the dashboard of the driver and to a battery 66, and from there to "ground." On the wheel in front of the core 60, the core 67 is arranged with its legs facing those of the core 60 and with as small an air gap as possible left between the legs of the two cores.

Figure 3:
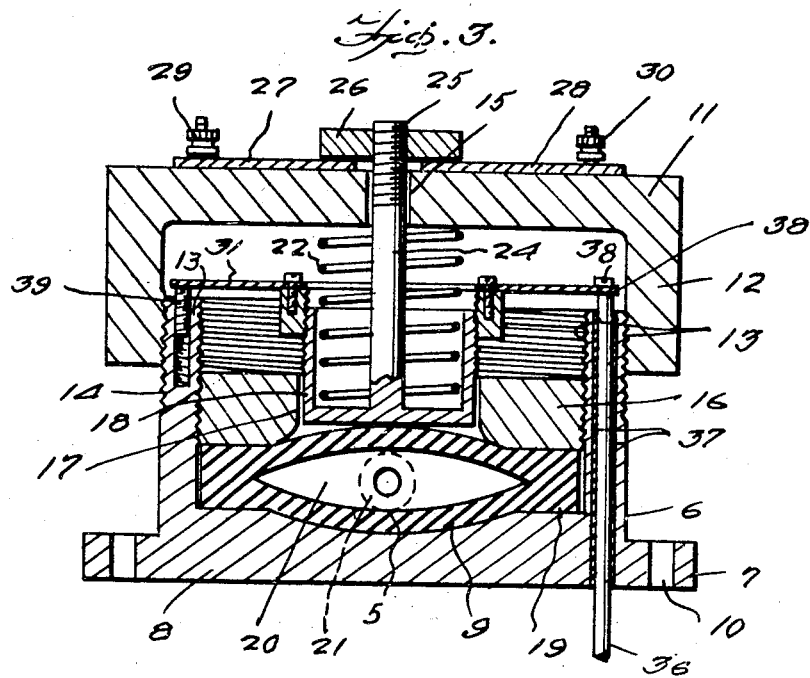
Figure 3 is an elevational cross-section through the same.
Figure 6:
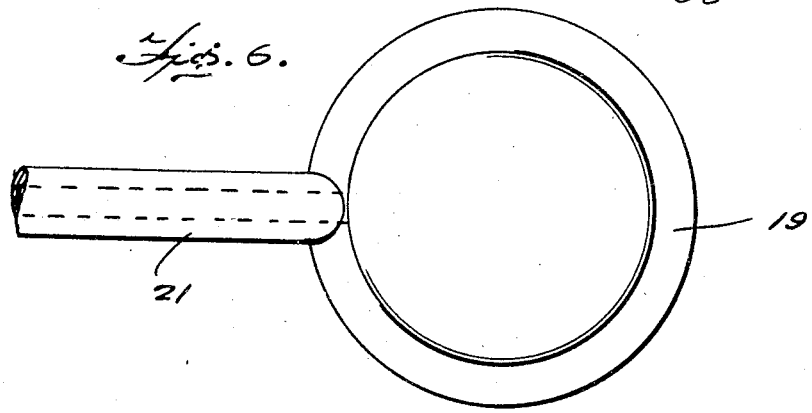
Figures 6 and 7 are a plan view and a side view, respectively, of the pressure chamber.
Figure 7:
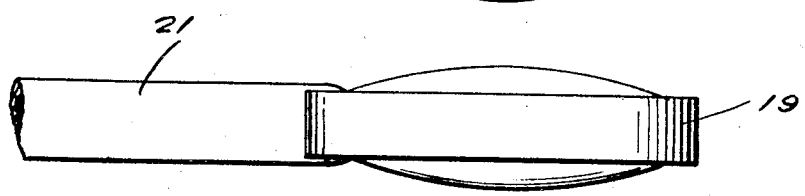

The core 67 is a small wheel with a rim 68 and a hub 69 projecting towards the body of the vehicle and forming the legs of the core, while the "yoke" is formed by the wheel disc of core 67. Said core is mounted preferably with the axis of the small wheel forming one leg of the core, coinciding with the axis of the vehicle wheel and the secondary winding 70 on said core is preferably wound around the central leg or hub portion 69. On the hub of the vehicle wheel (not shown in this figure) the container 6 with its lid 11, the binding parts 29 and 30, the contact strips 27, 28, and the movable contact 26 is mounted. The arrangement is identical with that described with reference to Figures 2 to 5 with the exception that rod 36 is dispensed with.

One terminal of the secondary winding 70 is connected with the binding post 29 while the other is connected with the binding post 30. When the secondary circuit is open at the contacts 27, 28, merely the pulsating, interrupted battery current is flowing through the primary circuit which is insufficient to operate the indicator 65. When the pressure in the tire decreases as described in connection with Figures 2 to 5, the movable contact 26 will bridge the contacts 27 and 28. The secondary circuit is closed and the primary current therefore is immediately increased to such an extent that the indicator 65 will be operated instantly.

The arrangement shown in Figure 11 differs from that in Figure 10 mainly by the arrangement of those parts which form the cores of the inductor. As the rear wheels turn with their axle, the secondary core consists of a short length of said axle 73 forming the "yoke" with two annular collars or flanges 74 forming the "legs" of the inductor core.

Opposing said legs the inductor core 75 carrying the primary winding 78 is arranged on the housing 77 of the rear axle with its legs opposing the collars 74 forming the legs of the secondary core. The windings 78, 79 may be connected as before. It may, however, be preferable in some cases, as shown in the figure, to have a grounded secondary circuit and in this case the terminal of the secondary winding 79 and the terminal 29 of the switch are grounded.

It will be seen from the above that the invention provides a reliable electric alarm signal operated by contacts located within the rotating wheel with a minimum of connection and with a continuous service substantially without parts which are in permanent fixture.

The device is sealed in the same fashion in which the tires are sealed and does not obstruct the removal and replacement of the tire.

The indicating device is much more accurate than all those devices which operate by pressing a stud or cap against the tire itself and is finely adjustable thus permitting to establish narrow limits for the pressure to be maintained in the tire and to keep regularly within such limits.

It is to be understood that the invention resides broadly in the arrangement and in the combination of parts as described and illustrated and that the specification is to be understood as being illustrative only but not intended to limit the scope of the invention. Many changes may obviously be made in the component parts and their assembly without in any way departing from the essence of the invention.

I claim:

1. In an indicator signal system for pneumatic tires mounted on rotating wheels, a single circuit including a source of pulsating currents and a signal, the currents normally flowing in the circuit being incapable of operating the signal, means for increasing the current flowing through said circuit, said means comprising an inductor with a single winding arranged on the rotating wheel and a stationary single winding in close proximity thereto, one of said windings being included in the aforesaid single circuit, a switch controlled short circuit for the other winding and pressure responsive means connected with the pneumatic tire for controlling the short circuit.

2. In an indicator signal system for pneumatic tires, mounted on rotating wheels, a rotating inductor, comprising a stationary iron core, with a winding thereon and a rotating iron core with a winding thereon, both arranged in close proximity to each other on the wheel and on a stationary part near the wheel respectively, a circuit containing a signal and a source of interrupted currents said currents when normally flowing in the circuit, being incapable of operating the signal connected with one of said windings, a pressure responsive switch and a circuit controlled thereby directly connected across the other winding for producing a strong inductor current, means for connecting the pressure responsive switch with the pneumatic tire under pressure and means to hold the pressure responsive switch in its open position when the tire pressure is normal, and to close it when the pressure falls below a predetermined limit.

PETER AMES CRESSEY.

REFERENCES CITED

The following references are of record in the file of this patent:

UNITED STATES PATENTS

| Number | Name | Date |
|---|---|---|
| 1,882,661 | Guthrie | Oct. 18, 1932 |
| 2,040,375 | Guthrie | May 12, 1936 |
| 2,057,556 | Cole | Oct. 13, 1936 |
| 2,260,246 | Woodruff et al. | Oct. 21, 1941 |

FOREIGN PATENTS

| Number | Country | Date |
|---|---|---|
| 555,514 | Germany | July 23, 1932 |